United States Patent [19]

Hatsutta et al.

[11] Patent Number: 4,564,235
[45] Date of Patent: Jan. 14, 1986

[54] LUMBAR SUPPORT DEVICE

[75] Inventors: Susumu Hatsutta; Takayuki Kōsaka, both of Akishima, Japan

[73] Assignee: Tachikawa Spring Co., Ltd., Tokyo, Japan

[21] Appl. No.: 670,367

[22] Filed: Nov. 9, 1984

[51] Int. Cl.⁴ .................................................. A47C 3/00
[52] U.S. Cl. ...................................... 297/284; 297/460
[58] Field of Search ................ 297/284, 460, 383, 361

[56] References Cited

U.S. PATENT DOCUMENTS

| | | | |
|---|---|---|---|
| 3,340,548 | 9/1967 | Janapol | 297/284 |
| 3,378,299 | 4/1968 | Sandor | 297/284 |
| 3,807,794 | 4/1974 | Beyer | 297/284 |
| 4,148,522 | 4/1979 | Sakurada et al. | 297/284 |
| 4,162,807 | 7/1979 | Yoshimura | 297/284 |
| 4,182,533 | 1/1980 | Arndt et al. | 297/284 |

Primary Examiner—Francis K. Zugel
Attorney, Agent, or Firm—Hoffman, Dilworth, Barrese & Baron

[57] ABSTRACT

An improved lumbar support device for use in a seat back of a vehicle seat is disclosed in which upper and lower lumbar plates are mounted in two stages independent of each other and each of the lumbar plates is connected via a connecting member to an arm engageable with a polyhedral cam, whereby the above-mentioned upper and lower lumbar plates can be moved and operated independently of each other by rotating the polyhedral cam by means of rotation of a handle shaft.

4 Claims, 9 Drawing Figures

LUMBAR SUPPORT DEVICE

BACKGROUND OF THE INVENTION

1. Field of the Invention

The present invention relates to an improved lumbar support device for use in a vehicle seat which is so constructed as to be able to control the supporting pressure of the lumbar support section of the seat by moving a pair of lumbar plates in a longitudinal direction by means of operation of an operation member.

2. Description of the Prior Art

Conventionally, lumbar support devices having a plurality of lumbar plates are generally constructed such that two lumbar plates respectively provided right and left of an operation shaft mounted within the lumbar support section of a seat are moved longitudinally at the same time by rotating the operation shaft. Therefore, although the conventional lumbar support devices of such construction can support the entire lumbar support section of the seat with uniform pressure, they are not be able to control their supporting pressure partially, for example, they can not support only the upper portion of the lumbar support section with higher pressure and the upper portion of the lumbar support section with lower pressure at the same time. As a result of this, the above-mentioned prior art devices can not provide a comfortable sitting touch.

SUMMARY OF THE INVENTION

The present invention aims at eliminating the drawbacks found in the above-mentioned conventional lumbar support devices.

Accordingly, it is a primary object of the invention to provide an improved lumbar support device which can support the entire lumbar support section of a seat with uniform pressure as well as is able to control or adjust their supporting pressure as desired with respect to one or more portions of the lumbar support section of the seat.

In attaining the above object, the present invention comprises a handle shaft rotatably mounted in a back frame, a polyhedral cam fixedly secured to said handle shaft, upper and lower arms respectively engaged with the upper and lower surfaces of said polyhedral cam, and a pair of upper and lower lumbar plates respectively connected via connecting members to said upper and lower arms to be moved longitudinally by means of the rotational displacement of said upper and lower arms, whereby said polyhedral cam is rotated to move said upper and lower lumbar plates independently of each other via said upper and lower arms so as to be able to control the pressure applied to said lumbar support section wholly or partially.

It is another object of the invention to provide an improved lumbar support device which is simple in structure and provides an improved operational performance.

To accomplish this object, according to the invention, a handle shaft to be rotated by means of an operation knob is provided with a polyhedral cam and upper and lower arms for urging against upper and lower lumbar plates are engaged with the upper and lower surfaces of said polyhedral cam via connecting members, respectively. In other other words, since said arms need only be engaged with the upper and lower surfaces of said polyhedral cam, the invention is simpler in structure than the above-mentioned prior art lumbar support devices. Also, since the supporting pressure given to the lumbar support section of a seat by said lower and upper lumbar plates can be controlled by rotating said handle shaft by said operation knob, the invention is improved in its operational performance.

These and other objects of the invention will be seen by reference to the description, taken in connection with the accompanying drawings.

DETAILED DESCRIPTION OF A PREFERRED EMBODIMENT OF THE INVENTION

Figure 1:
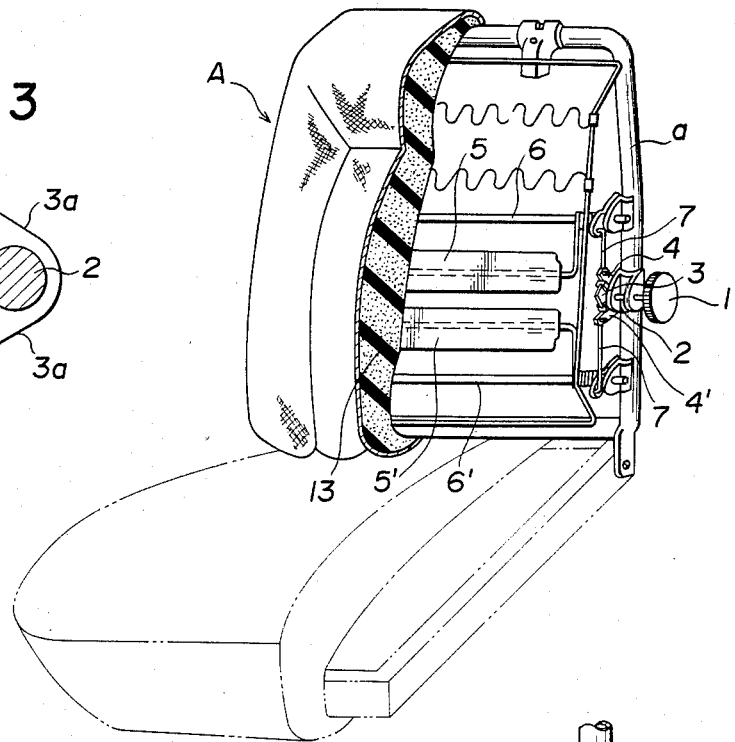
FIG. 1 is a partially cutaway, perspective view of a vehicle seat which incorporates a lumbar support device of the invention therein.
Figure 2:
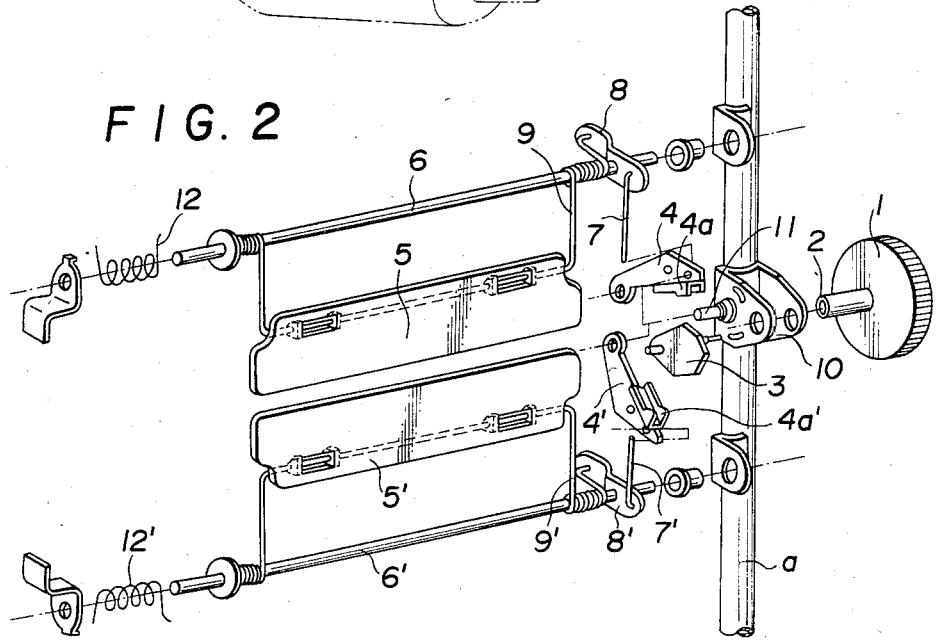
FIG. 2 is an exploded view of the lumbar support device of the invention.

FIG. 1 shows a vehicle seat which is provided with a lumbar support device constructed in accordance with the present invention, and FIG. 2 illustrates an exploded view of the lumbar support device of the invention. In the drawings, reference character (A) designates a seat back of the vehicle seat, and (a) represents a back frame of a pipe constituting a part of the seat back. A bracket (10) is fixed by welding or the like to the lower portion of the back frame (a), and a handle shaft (2) with an operation knob (1) is rotatably inserted through the bracket (10). A polyhedral cam (3) is fixed to the handle shaft (2) within the seat back (a) and it is rotated as the handle shaft (2) is rotated. The above-mentioned bracket (10) is also provided with a pivot shaft (11) fixed thereto parallel with the handle shaft (2). The first ends of the respective upper and lower arms (4), (4') are pivotally mounted onto the top end of the pivot shaft (11). Upper and lower arms (4), (4') are respectively provided with end edges adapted to be engaged with the upper and lower end faces of the above-mentioned polyhedral cam (3). Engagement pieces (4a), (4a') are respectively formed with a U-shaped section and are fixed to the above edges for proper engagement with the polyhedral cam (3).

Figure 3:
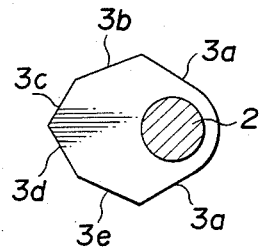
FIG. 3 is a plan view of a polyhedral cam employed in the invention.

FIG. 3 illustrates an example of the above-mentioned polyhedral cam (3), in which (3a) (3a) designate end edges provided symmetrically with respect to the handle shaft (2) to push against upper and lower lumbar plates (5) (5') to be described later with the same and uniform pressure, and (3b), (3c), (3d) and 3(e) represent end edges respectively different in distance from the center of the handle shaft (2). The last-mentioned four end edges are adapted such that when they are engaged with the upper and lower arms (4), (4') they cause the upper and lower lumbar plates (5), (5') to provide different pressures through the upper and lower arms (4), (4')

In the drawings, (5), (5') designate the upper and lower lumbar plates, respectively, which are fixedly mounted to mounting shafts (6), (6') elastically in a longitudinal direction by springs (9), (9') wound around the mounting shafts (6), (6'). The upper and lower lumbar plates (5), (5') are formed in upper and lower two stages independent from each other along the mounting shafts (6), (6'). Mounting shafts (6), (6') are positioned to extend rotatably between the two right and left back frames (a), (a).

The above-mentioned mounting shafts (6), (6') are further provided with rotary pieces (8), (8') fixed thereto, respectively. To the respective first ends of these rotary pieces (8), (8') are fixed the respective first ends of the above-mentioned springs (9), (9'), while connecting rods (7), (7') to be fixed to the upper and lower arms (4), (4') are connected to the respective second ends of the rotary pieces (8), (8'). With such structure, as the polyhedral cam (3) is rotated the arms (4), (4') are rotated about the pivot shaft (11), which in turn causes the rotary pieces (8), (8') to rotate together with the mounting shafts (6), (6') by means of the connecting rods (7), (7'), respectively, so as to move the above-mentioned lumbar plates (5), (5') longitudinally. These longitudinal movements of the lumbar plates (5), (5') permit control or adjustment of the pressures with which the lumbar support section (13) of the seat is supported.

In the drawings, reference numerals (12), (12') respectively designate springs which are used to bias the arms (4), (4') towards the polyhedral cam (3) into engagement therewith.

Figures 4A, 4B, 4C:
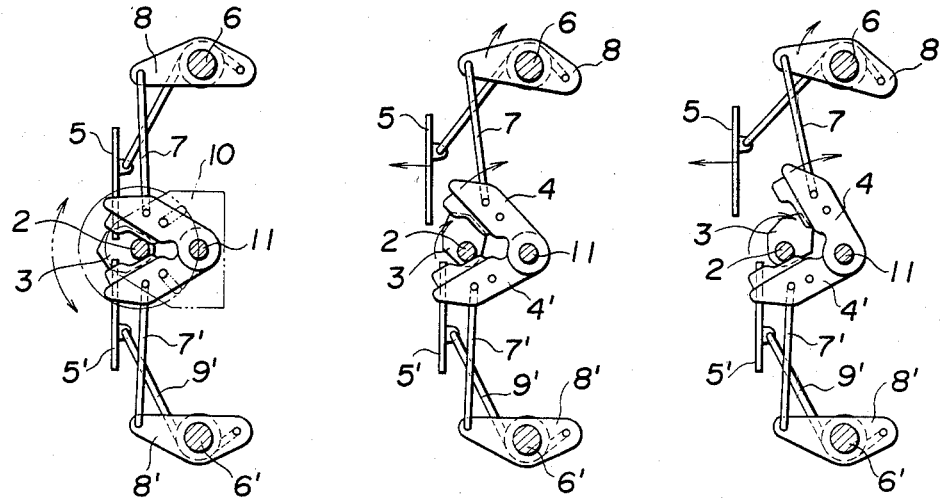
FIGS. 4(A), 4(B) and 4(C) are respectively side views of the lumbar support device of the invention, illustrating how to change the state of the lumbar support device of the invention; in particular, from a first position wherein upper and lower lumbar plates in the lumbar support device are both supporting the lumbar support section of the above seat with uniform pressure into a second position wherein the upper lumbar plate of the lumbar support device is supporting the lumbar support section with higher pressure while the lower lumbar plate is supporting the same with lower pressure; and, FIGS. 5(A), 5(B) and 5(C) are side views similar to FIGS. 4(A), 4(B) and 4(C), illustrating the change of the state of the present lumbar support device in the opposite direction to the above-mentioned direction in FIG. 4.

FIGS. 4(A), (B) and (C) illustrate a case in which the operation knob (1) is rotated clockwise to push forward the upper lumbar plate (5) so as to increase the supporting pressure of the upper portion of the lumbar support section (13) of the seat to a higher level.

Figures 5A, 5B, 5C:
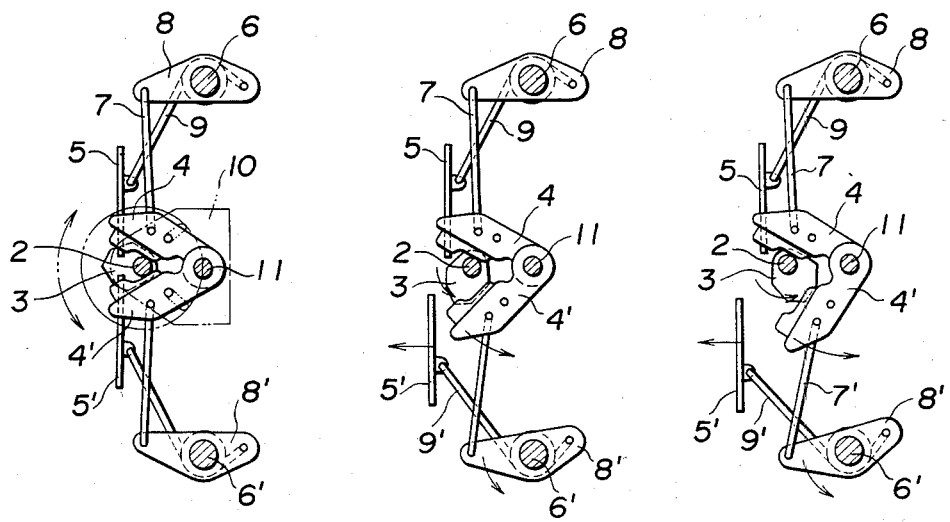

On the other hand, FIGS. 5(A), (B) and (C) illustrate a case in which the operation know (1) is rotated counterclockwise to push forward the lower lumbar plate (5') so as to increase the supporting pressure of the lower portion of the same lumbar support section (13) to a higher level.

Further, it should be noted that FIGS. 4(A) and 5(A) respectively illustrate a state in which both of the upper and lower lumbar plates (5), (5') are pushed out forwardly with the same pressure to push against the entire lumbar support section (13) of the seat with the same and uniform pressure.

Since the present invention is constructed in such a manner as mentioned before, it is capable of adjusting the upper and lower lumbar plates simultaneously if a polyhedral cam of a desired configuration is selectively used as desired. Accordingly, the invention is able to control the supporting pressure of the lumbar support section of the seat wholly or partially, and thus it can adjust the supporting pressure in accordance with the physical features of occupants of the seat or it can press against only a portion of the lumbar region of the occupant locally as desired by the occupant. In other words, the invention provides a seat that can give a comfortable sitting touch to its occupant.

Further, since the above-mentioned control or adjustment can be performed simply by operating a single operation member, the present invention is improved in operationability, simple in structure, and can be supplied at lower costs.

What is claimed is:

1. A lumbar support device for use in a vehicle seat, comprising a handle shaft rotatably mounted to a back frame of said vehicle seat, a polyhedral cam fixedly secured to said handle shaft, upper and lower arms engageable with the upper and lower surfaces of said polyhedral cam, and a pair of upper and lower lumbar plates respectively connected via connecting members to said upper and lower arms and movable longitudinally by means of the rotational displacements of said upper and lower arms, characterized in that said upper and lower lumbar plates can be moved independently of each other through said upper and lower arms by rotating said polyhedral cam.

2. The lumbar support device as set forth in claim 1, wherein said upper and lower lumbar plates are respectively mounted independently of each other to a mounting shaft extended across said back frame and are respectively connected via said connecting members to said upper and lower arms, and wherein each of said connecting members comprises a spring wound around said mounting shaft and having one end thereof secured to said lumbar plate and the other end thereof secured to a rotary piece mounted to said mounting shaft, and a connecting rod connecting said rotary piece to each of said upper and lower arms.

3. The lumbar support device as set forth in claim 1, wherein said polyhedral cam is provided along its peripheral edge with two symmetrically positioned arm engagement surfaces as well as a plurality of arm engagement surfaces respectively having different distances from the center of said handle shaft.

4. The lumbar support device as set forth in claim 1, wherein said handle shaft is provided with an operation knob.

* * * * *